Feb. 6, 1934.   C. B. KINGSLEY   1,945,695
METHOD AND APPARATUS FOR MAKING WIRE GLASS
Filed Nov. 7, 1929
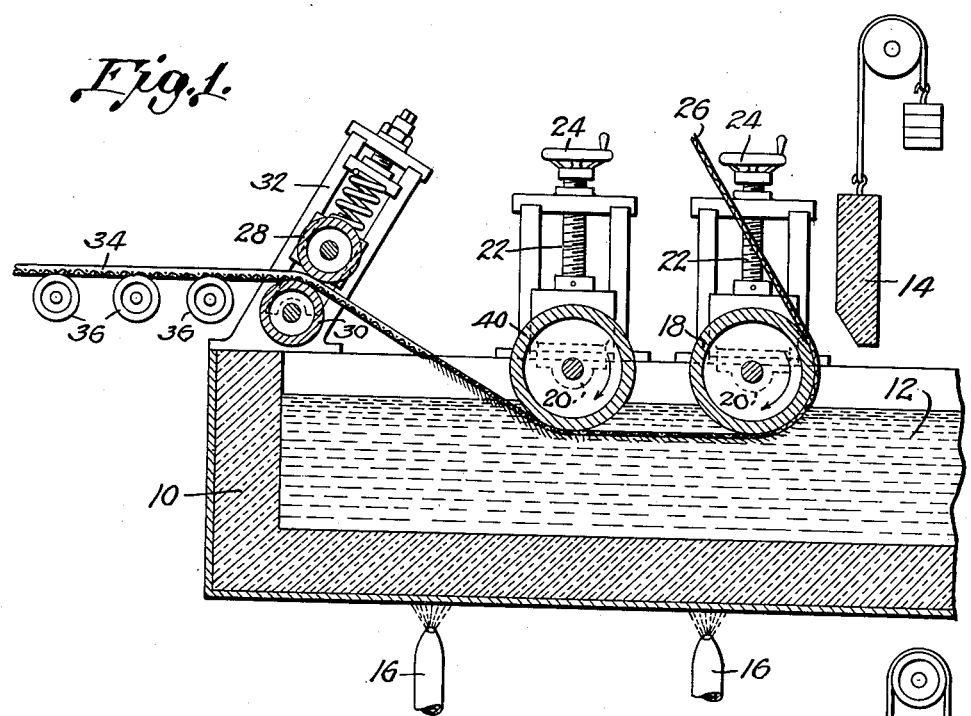
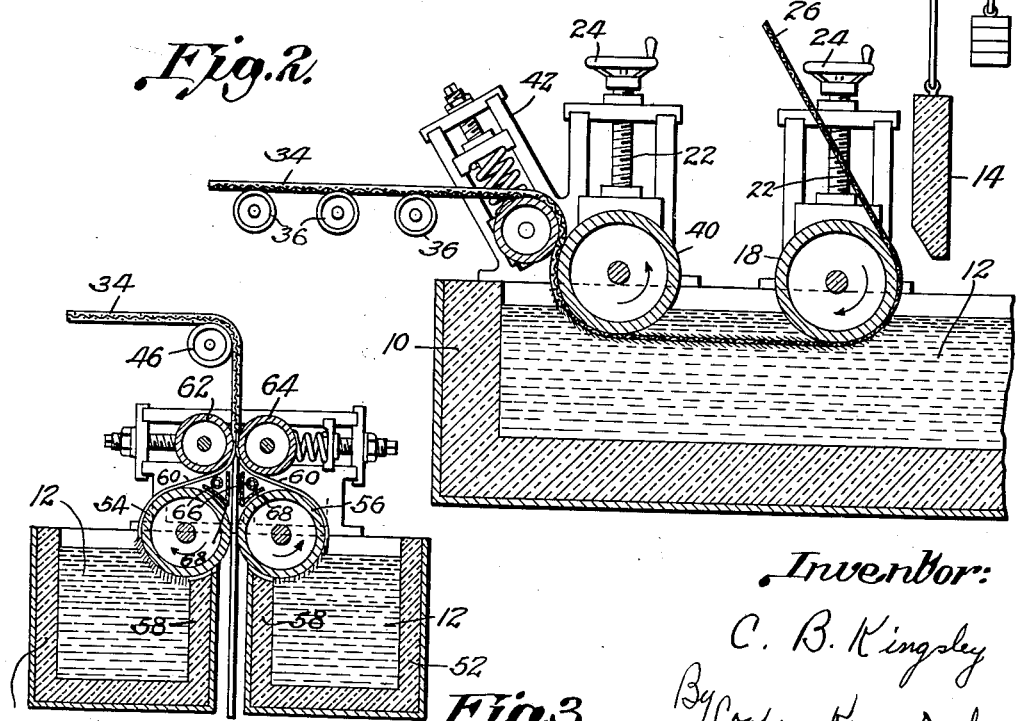
Inventor:
C. B. Kingsley
By Cooper, Kerr + Dunham Patented Feb. 6, 1934

1,945,695

UNITED STATES PATENT OFFICE 1,945,695

METHOD AND APPARATUS FOR MAKING WIRE GLASS

Charles B. Kingsley, Clairton, Pa., assignor to Mississippi Glass Company, New York, N. Y., a corporation of New York Application November 7, 1929. Serial No. 405,308

7 Claims. (Cl. 49—32)

This invention pertains to new and improved apparatus and method for drawing wire glass from a bath of molten metal and forming a sheet of glass therewith.

In previous attempts to make wire glass in that manner many difficulties have been encountered and the product has been of inferior quality as compared with glass made by the more familiar processes. Among the difficulties have been: the high tension created in the wire mesh before it enters the glass; the high temperature to which the uncovered wire is subjected; the trapping of air in the glass by the wire when applied to the under side of a pre-formed glass sheet; the complicated and difficult process involved in threading the "bait" through the apparatus in order to start the sheet; the production of caramel or checkered surfaces on the glass; keeping the wire mesh centrally located in the finished sheet; distortion and discoloration of the wire mesh; etc.

The principal object of the present invention is to provide apparatus and method to meet and overcome the above difficulties.

Further and other objects and advantages will be apparent from the specification and claims, and from the drawing which illustrates what is now considered the preferred form of the invention.

Fig. 1 is a sectional view of a simple form of the apparatus.

Fig. 2 shows a simplified modification of Fig. 1, in which one of the submerged drums serves also as one of the drawing rolls.

Fig. 3 shows the glass sheets formed on the outsides of the submerged drums with the reinforcing fabric passing upwardly between those drums to enter the sheet at the bite of the drawing rolls.

Referring to Fig. 1, which shows a simple application of the invention, 10 is an extension of a melting furnace or tank containing a bath of molten metal 12. The flow of metal may be controlled by a gate such as 14, and the temperature may be regulated by burners 16. Partially submerged in metal 12 are cooling drums 18 and 40, supported for rotation by suitable means, (not shown) in bearings 20 which are vertically adjustable by screws 22 and hand wheels 24.

Drums 18 and 40 are usually smooth, but if an unusually thick sheet of glass is wanted it may be desirable to have the drum surface carry fins, projections or indentations to enable a thicker body of glass to form between wire and drum.

To start the apparatus in operation, drums 18 and 40 are raised above the molten metal by means of handwheels 24. Wire mesh 26 is then passed around the drums and through the forming pass between upper and lower drawing and sizing rolls 28 and 30, adjustably mounted in frame 32. Drums 18 and 40, being rotated as indicated by the arrows, are then lowered into metal 12, drawing wire 26 with the minimum possible tension from an overhead supply roll (not shown) downwardly into the molten glass where it becomes encased in the layer of cooled and less fluid glass adjacent to the surface of the cooling rolls. By the action of the drawing rolls these layers of cooled and somewhat stiffened glass, with the wire reinforcement embedded in it, are drawn into the forming and sizing pass, from which it emerges as a sheet 34, to be carried by conveyor rolls 36 to the leer.

It is customary to make the drums 18 and 40 hollow in order to adapt them for cooling by water or air supplied to the drum interior. By regulating the temperature of metal 12 and drums 18 and 40 the consistency of the glass adjacent the drum surface may be regulated, whereby the thickness of the glass casing on the wire mesh is under full control of the operator.

Fig. 2 shows a simplified modification of Fig. 1 in which the lower forming roll 30 is done away with, and drum 40 is made to serve in place thereof. Roll 28 is supported in proper operative relationship with drum 40 by a suitable frame 42.

A further modification is shown in Fig. 3, in which tank 10 is replaced by a pair of tanks or interconnected compartments 52, and drums 18 and 40 are replaced by drums 54 and 56, each set into the top of a low wall 58 of a compartment 52 and rotating toward the metal in the tank, in which manner they act as dams or closures to prevent flow of metal over the tops of walls 58. Drums 54 and 56 are spaced slightly apart and the reinforcing mesh 26 passes up between them. The drums are rotated in opposite directions as indicated. On each drum is formed a layer 60, the two layers passing around the outsides of the drums and meeting at the pass between forming rolls 62, 64, where the finished sheet is formed with wire mesh 26 embedded in it.

Sheets 60 may be heated by burners 66 before entering the forming pass, in which case shields 68 are provided to protect the cooling rolls and wire from the heat of the burners.

It is to be understood that the invention is not limited to the specific construction herein described and illustrated but may be used in other ways without departure from its spirit as defined by the following claims.

I claim—

1. In the method of making wire glass, the steps of rotating a pluraliity of cooling drums partially submerged in a bath of molten metal whereby a layer of relatively stiffened metal is formed adjacent the surface of each of said drums, drawing wire mesh about said submerged drum surfaces in succession whereby said wire becomes encased in the relatively stiffened metal, and passing said wire and casing through a roll pass to form therefrom a sheet of wire glass of predetermined thickness.

2. Apparatus for forming sheet glass comprising in combination, a plurality of cooling drums adapted for rotation while partially submerged in a bath of molten metal whereby a layer of relatively stiff metal is formed at the surface of each of said drums, means for passing reinforcing wire about said submerged surfaces in succession whereby said wire is encased in metal from both said layers, and means for drawing said encased wire through a forming pass whereby a sheet of wire reinforced glass is formed.

3. Apparatus for forming sheet glass comprising in combination, a plurality of cooling drums adapted for rotation while partially submerged in a bath of molten metal whereby a layer of relatively stiff metal is formed at the surface of each of said drums, means for passing reinforcing wire about said submerged surfaces in succession whereby said wire is encased in metal from both said layers, and means for drawing said encased wire through a pass formed between one of said cooling drums and a roll adjacent thereto, whereby said wire and its casing are rolled into a sheet of wire reinforced glass.

4. In apparatus for making wire glass, in combination, a pair of interconnected tanks set side by side and adapted to contain molten metal, the tops of the adjacent walls of said tanks being below the level of the molten metal, cooling drums above said low walls and closely adjacent thereto, the lower portions of said drums being in contact with the molten metal and rotatable therethrough whereby a layer of relatively stiff metal is formed on the surface of each drum, and means for drawing said layers through a forming pass whereby said layers are combined to form a sheet of glass.

5. The invention set forth in claim 4 in which wire mesh is fed between said glass layers at the pass in order to form a sheet of wire reinforced glass.

6. The invention set forth in claim 4 in which wire is fed upwardly between said cooling drums to enter the roll pass with said glass layers and form therewith a sheet of reinforced wire glass.

7. In apparatus for forming sheet wire glass, in combination, an open top receptacle for holding a molten glass bath, a plurality of imperforate, smooth faced cooling drums partially submerged in said bath which are adapted to increase the viscosity of the molten glass around the drums whereby a layer of relatively stiff smooth glass is formed solely thereby on the surface of said drums, means for artificially internally cooling said drums, means for revolving the same, means for moving a wire fabric in relation to said layers to encase said wire in glass, and means for regulating the thickness of said sheet comprising a plurality of rollers at least one of which is adjustable and independent of and in addition to the cooling drums.

CHARLES B. KINGSLEY.